United States Patent
Brombach et al.

(10) Patent No.: US 11,264,798 B2
(45) Date of Patent: *Mar. 1, 2022

(54) CHARGING STATION HAVING DYNAMIC CHARGING CURRENT DISTRIBUTION

(71) Applicant: Wobben Properties GmbH, Aurich (DE)

(72) Inventors: Johannes Brombach, Berlin (DE); Christian Strafiel, Aurich (DE); Stefan Gertjegerdes, Aurich (DE)

(73) Assignee: Wobben Properties GmbH, Aurich (DE)

( * ) Notice: Subject to any disclaimer, the term of this patent is extended or adjusted under 35 U.S.C. 154(b) by 96 days.

This patent is subject to a terminal disclaimer.

(21) Appl. No.: 16/633,924

(22) PCT Filed: Jul. 26, 2018

(86) PCT No.: PCT/EP2018/070293
§ 371 (c)(1),
(2) Date: Jan. 24, 2020

(87) PCT Pub. No.: WO2019/020747
PCT Pub. Date: Jan. 31, 2019

(65) Prior Publication Data
US 2021/0129701 A1 May 6, 2021

(30) Foreign Application Priority Data

Jul. 26, 2017 (DE) ..................... 10 2017 116 887.7

(51) Int. Cl.
*B60L 53/62* (2019.01)
*B60L 53/67* (2019.01)
(Continued)

(52) U.S. Cl.
CPC .............. *H02J 1/102* (2013.01); *B60L 53/62* (2019.02); *B60L 53/67* (2019.02); *B60L 2210/10* (2013.01); *H02M 3/42* (2013.01)

(58) Field of Classification Search
CPC ...... B60L 53/62; B60L 53/67; B60L 2210/10; H02M 3/42
(Continued)

(56) References Cited

U.S. PATENT DOCUMENTS

| 5,926,004 A | 7/1999 | Henze |
| 9,065,356 B2 * | 6/2015 | Funato et al. ........ H02M 7/537 |

(Continued)

FOREIGN PATENT DOCUMENTS

| CN | 101483350 A | 7/2009 |
| CN | 104810894 A | 7/2015 |

(Continued)

*Primary Examiner* — Sun J Lin
(74) *Attorney, Agent, or Firm* — Seed Intellectual Property Law Group LLP

(57) ABSTRACT

A charging station for charging a plurality of electric vehicles, in particular electric automobiles, comprising: a supply device, in particular for connection to an electricity supply grid for supplying the charging station with electric power, a plurality of charging terminals for charging in each case at least one electric vehicle, and each charging terminal comprises a supply input for drawing electric power from the supply device, a charging output with one or more charging connections for outputting a respective charging current for charging a respective connected electric vehicle, and at least one DC chopper arranged between the supply input and the charging output in order to generate a respective chopper current from the electric power of the supply device, or as an alternative at least one chopper terminal arranged between the supply input and the charging output in order to provide a chopper current generated outside the charging terminal by a DC chopper, in particular chopper (Continued)

current generated in the supply device, wherein in each case each charging current is formed from a chopper current or a plurality of chopper currents, and wherein the charging terminals are connected to one another at exchange connections via electrical exchange lines in order thereby to exchange chopper currents with one another.

19 Claims, 4 Drawing Sheets

(51) Int. Cl.
  *H02J 1/10* (2006.01)
  *H02M 3/42* (2006.01)
(58) Field of Classification Search
  USPC .......................................................... 320/109
  See application file for complete search history.

(56) References Cited

U.S. PATENT DOCUMENTS

| | | | |
|---|---|---|---|
| 9,209,638 | B2 | 12/2015 | Bouman |
| 9,371,008 | B2 | 6/2016 | Bouman |
| 9,493,082 | B1 | 11/2016 | Tse |
| 9,555,715 | B2* | 1/2017 | Sugano ................... B60L 53/64 |
| 10,093,193 | B2 | 10/2018 | Ohkuma et al. |
| 10,759,293 | B2* | 9/2020 | Heyne et al. ............ B60L 53/30 |
| 10,800,271 | B2* | 10/2020 | Vienken et al. ......... B60L 53/11 |
| 10,933,764 | B2* | 3/2021 | Heyne et al. ............ B60L 53/14 |
| 10,974,612 | B2* | 4/2021 | Heyne et al. ......... H02J 7/0029 |
| 2004/0130292 | A1 | 7/2004 | Buchanan et al. |
| 2010/0106631 | A1 | 4/2010 | Kurayama et al. |
| 2011/0285345 | A1 | 11/2011 | Kawai et al. |
| 2011/0291616 | A1 | 12/2011 | Kim et al. |
| 2013/0049677 | A1 | 2/2013 | Bouman |
| 2013/0057209 | A1 | 3/2013 | Nergaard et al. |
| 2013/0069592 | A1 | 3/2013 | Bouman |
| 2013/0103191 | A1 | 4/2013 | Bouman |
| 2014/0320083 | A1 | 10/2014 | Masuda et al. |
| 2015/0165917 | A1 | 6/2015 | Robers et al. |
| 2015/0326040 | A1 | 11/2015 | Kawai et al. |
| 2017/0240063 | A1 | 8/2017 | Herke et al. |
| 2018/0134166 | A1 | 5/2018 | Li et al. |
| 2018/0212438 | A1 | 7/2018 | Bouman |
| 2020/0139827 | A1 | 5/2020 | Koolen et al. |
| 2021/0101500 | A1* | 4/2021 | Brombach et al. ........ H02J 7/00 |

FOREIGN PATENT DOCUMENTS

| | | |
|---|---|---|
| CN | 105449791 A | 3/2016 |
| CN | 105480110 A | 4/2016 |
| CN | 106564399 A | 4/2017 |
| DE | 102011079430 A1 | 1/2013 |
| DE | 102012218738 A1 | 4/2014 |
| EP | 2110923 A1 | 10/2009 |
| EP | 2388884 A2 | 11/2011 |
| EP | 2784899 A1 | 10/2014 |
| EP | 2751902 B1 | 9/2017 |
| EP | 3321122 A2 | 5/2018 |
| JP | H05-276673 A | 10/1993 |
| JP | 2007535282 A | 11/2007 |
| JP | 2007323843 A | 12/2007 |
| JP | 2008199752 A | 8/2008 |
| JP | 2013-027236 A | 2/2013 |
| JP | 2013192310 A | 9/2013 |
| JP | 2015109790 A | 6/2015 |
| JP | 2017118768 A | 6/2017 |
| KR | 20110137675 A | 12/2011 |
| RU | 2520616 C1 | 6/2014 |
| RU | 2550109 C2 | 5/2015 |
| RU | 2553617 C2 | 6/2015 |
| WO | 2013/137501 A1 | 9/2013 |

* cited by examiner

CHARGING STATION HAVING DYNAMIC CHARGING CURRENT DISTRIBUTION

BACKGROUND

Technical Field

The present invention relates to a charging station for charging a plurality of electric vehicles, in particular electric automobiles. The present invention also relates to a method for charging a plurality of electric vehicles.

Description of the Related Art

With the increasing number of electric vehicles registered on the road, it may be expected in the future that a comprehensive expansion of the infrastructure for charging electric vehicles will be required. One particular requirement for a charging infrastructure here is to be able to charge the electric vehicles as quickly as possible. Particularly in areas with a high volume of electric vehicles, a particularly high requirement for rapid charging systems may be expected. Examples of such areas are freeway service stations or inner city areas in a large city in which long downtimes are not desirable for the electric vehicles.

When building or designing a charging station, technological challenges that have to be met arise in the process. One problem when operating a charging station for charging electric vehicles is for example that different vehicle types that are connected to the charging columns or charging terminals of the charging station have very different requirements in terms of the charging current and the charging voltages. In some vehicle types, for example, a very high charging current may be required for rapid charging, but said charging current also drops again quickly. In other vehicle types, however, a relatively constant current is required over a longer period of time. Since the charging terminals are usually designed to be able to charge all vehicle types, a charging column would therefore only be used at full load to a relatively small extent on average. The charging terminal would then specifically not always output its maximum charging current to an electric vehicle because the electric vehicle does not require it or requires it only temporarily.

The German Patent and Trademark Office has searched the following prior art in the priority application relating to the present application: US 2010/0106631 A1, US 2013/0057209 A1, US 2014/0320083 A1, JP H05-276673 A, WO 2013/137501 A1.

BRIEF SUMMARY

Provided are a method and a charging station that at least enables better use at full load of the charging terminals in the charging station.

Provided is a charging station to charge a plurality of electric vehicles, in particular electric automobiles.

The charging station thus comprises a supply device, in particular for connection to an electricity supply grid, in order to supply the charging station with electric power. The charging station thus draws electric power or electrical energy from the electricity supply grid and provides it to the charging terminals. To this end, the supply device may be connected to an electricity supply grid, in particular via a transformer. In addition, a rectifier may be provided in the supply device in order to rectify AC current drawn from the electricity supply grid and to provide it to the charging terminals. The supply device may also have an energy store, in particular a battery, in order to buffer electrical energy.

In addition to the supply device, the charging station also comprises a plurality of charging terminals. The charging terminals, which may in particular also be designed as charging columns, are fixed terminals to which—similarly to fuel pumps of a conventional filling station—the electric vehicles are able to be connected via a charging cable for charging. There is preferably provision for a plurality of electric vehicles also to be able to be connected to one charging terminal. The connection may in this case also be made simultaneously. According to one embodiment, two electric vehicles may be connected to the same charging terminal at the same time for charging.

Each charging terminal in this case comprises a supply input, which may also be referred to synonymously as a supply input area, for drawing electric power from the supply device. This may take place directly or indirectly. Each charging terminal is thus electrically coupled to the supply device and draws power provided by the supply device at the supply input.

In addition to the supply input, each charging terminal also comprises a charging output, which may also be referred to synonymously as a charging output area, with one or more charging connections for outputting a respective charging current for charging a respective connected electric vehicle. It is thus proposed for each charging terminal to have at least one charging connection, wherein a respective electric vehicle is able to be connected to each charging connection. The number of charging connections thus corresponds to the number of electric vehicles able to be connected to the terminal. The charging connection is in this case a connection point on the charging terminal to which for example a charging cable is connected in order to connect an electric vehicle to the terminal. Such a charging cable may also be considered to be part of the connection point.

As a further component of the charging terminal, at least one DC chopper is proposed, which is arranged between the supply input and the charging output of the charging terminal in order to generate a respective chopper current from the electric power of the supply device and also to control said chopper current. The DC chopper may also be referred to simply and synonymously as a chopper.

If for example two DC choppers are present in a charging terminal and are essentially connected in parallel with one another between the supply input and the charging output, two chopper currents may be generated independently of one another by a respective DC chopper. The DC chopper in this case converts first DC voltage or the first DC current drawn via the supply input and supplied by the supply device into a second DC current adapted for the electric vehicles. A typical power range of the DC chopper, which may also be referred to as a DC-to-DC converter, is 50 kW, the converter being able to generate a chopper current of for example 125 A at 400 V DC voltage or 62.5 A at 800 V DC voltage. These are typical values for a charging current by way of which electric vehicles are able to be charged.

It therefore also comes into consideration and is proposed for at least one DC chopper, in particular all of the DC choppers, to be internally changeable, in particular switchable, such that they change their respective voltage level depending on the requirements of the vehicle to be charged. It is in particular proposed for each of them to be able to double or halve their voltage, while simultaneously halving or doubling their output current.

As an alternative, it is proposed for a charging terminal to have at least one chopper terminal arranged between the supply input and the charging output in order to provide a chopper current generated outside the charging terminal by a DC chopper, in particular chopper current generated in the supply device. In this variant, the chopper terminal thus provides a chopper current without however generating this itself.

For this purpose, the chopper current may be generated by an external DC chopper that is arranged outside the charging terminal and that is particularly preferably arranged in the supply device. The chopper current may be supplied to the chopper terminal by such an external DC chopper via corresponding lines. These lines only need to be dimensioned for this chopper current of the single DC chopper. The chopper terminal then provides the chopper current in exactly the same way as the DC chopper does in the other variant, which may also be referred to as an internal DC chopper.

The further use of the chopper current is basically the same for both variants.

Each charging current that is used at a charging connection for charging an electric vehicle is formed in this case from one chopper current or a plurality of chopper currents. If a charging terminal comprises for example two DC choppers or two chopper terminals and two charging connections, the charging terminal is configured so as to generate a superimposed charging current from two chopper currents at one of the two charging connections if this is required. In one specific example, if only one electric vehicle is connected to a charging terminal with two charging connections, both DC choppers or both chopper terminals may thus be used to charge the vehicle. In a further example, if two vehicles are connected to the charging terminal at the same time, the vehicles may also be charged separately with in each case only one chopper current as charging current. The charging terminal may thus advantageously ideally utilize the internally installed DC choppers or chopper terminals together to charge an electric vehicle and switch them on and off. This is particularly beneficial when only one electric vehicle is connected for charging and requires a high charging current or a high charging power. The high charging power may then be provided here, for example, with the two DC choppers or two chopper terminals mentioned by way of example.

In addition to the possibility of using the chopper currents of a plurality of DC choppers or of a plurality of chopper terminals of in each case only one charging terminal to charge an electric vehicle, there is provision for the charging terminals to be connected to one another at exchange connections via electrical exchange lines in order thereby to exchange chopper currents with one another, such that a charging current of a charging terminal may consist of a plurality of chopper currents from a plurality of charging terminals.

Explanations described below regarding the arrangement and/or connection of DC choppers of a charging terminal or of an auxiliary current terminal should also be applied analogously to chopper terminals, unless stated otherwise or obvious. Described modes of operation of DC choppers of a charging terminal or of an auxiliary current terminal also relate to DC choppers that are arranged at other points, in particular including those that are arranged in the supply device.

It has been recognized that different vehicle types have very different requirements in terms of the charging currents and charging voltages. By way of example, the charging current drops very quickly over time during rapid charging in the case of some car types. A single charging column, which is designed for example for such rapid charging, is thus used at full load only to a very small extent on average. In one simple example, an electric vehicle has a charging current requirement of two chopper currents. After a short time, however, this current requirement then drops such that only one chopper current is required for charging, since the vehicle is already 80% charged, for example. The charging column that delivered such a second chopper current and then no longer needs to deliver it may then provide it in another way. It may then make its unused chopper current available to another charging terminal via the exchange lines, or provide a charging current at its own charging output.

In order to make better use of the charging terminals, a solution is thus proposed that makes it possible to dynamically exchange the chopper currents with one another via exchange lines on the charging side of the terminals, depending on the power or current requirement required by the vehicles. An electric vehicle may thus also draw a chopper current from an adjacent charging terminal, even though no vehicle is connected to this adjacent terminal, for example. The charging station thus makes it possible for the charging current used for charging the electric vehicles also to be able to be drawn directly from adjacent charging terminals, or also for chopper currents to be made available to another charging terminal if no high charging current is required for charging an electric vehicle. Not only is a situation able to be achieved whereby the available power is distributed variably, but it is also possible to variably perform charging of an electric vehicle with smaller or medium-sized DC choppers that requires a charging current that is significantly higher than any single DC chopper could deliver. It is thus also possible to save costs with the DC choppers.

One particular feature of this variability is that it is achieved locally at the charging terminals. It should be noted in this case that, by combining a plurality of chopper currents to form a large charging current, appropriately designed lines that are able to conduct such high currents are also required. With currents of several 100 A, the requirements for such lines are high. However, such high currents are only required for certain vehicles and then also only for a short period of time. However, all lines that come into consideration in principle for transmitting such high currents must also be designed for such high currents. Most lines are then greatly oversized most of the time. The solution makes it possible for this to be necessary only in the area of the charging terminals. For this purpose, the lines may be designed for example as busbars between the charging stations. In particular, this eliminates the need for oversized lines between the supply device and the charging terminals.

This is achieved by making flexible interconnections, in particular in the area of the charging terminals. Avoiding overdimensioned or oversized lines, in particular between the supply device and the charging terminals, is achieved regardless of whether the charging terminals themselves have DC choppers in order to generate the chopper currents or whether they already receive the chopper currents as such from external current choppers. In any case, the flexible interconnection in order to combine, that is to say add, chopper currents according to requirement is made in the area of the charging terminals. Although a dedicated external line is required for each chopper terminal in order to supply the chopper current, it only needs to be dimensioned for this chopper current. Overdimensioning is able to be avoided.

According to one embodiment, there is also provision for a charging station to have different charging terminals, specifically one or more charging terminals that have DC choppers and one or more charging terminals that have chopper terminals. This may particularly preferably be advantageous for retrofitting a charging station if a charging station has a plurality of charging terminals with DC choppers that receive their power from the supply device via a large supply line. This charging station may then easily be expanded by one or more charging terminals, each of which has only current terminals, by arranging corresponding DC choppers in the supply device and laying only correspondingly small lines from there to the new charging terminals. The new charging terminals may still be integrated into the flexible architecture of the existing charging terminals. Chopper currents from internal DC choppers may then be combined with or added to chopper currents from external DC choppers, as required.

It is preferably proposed for the charging station to have at least one auxiliary current terminal for providing, in particular generating, one or more additional chopper currents in order to provide these to at least one charging terminal. The auxiliary current terminal itself in this case has no charging output. For this purpose, each auxiliary current terminal comprises a supply input corresponding to the supply input of a charging terminal for drawing electric power from the supply device, at least one exchange connection corresponding to the exchange connection of a charging terminal for transmitting chopper currents to at least one of the charging terminals, and at least one DC chopper arranged between the supply input and the at least one exchange connection and corresponding to the DC chopper of the charging terminal. These connections are provided in order to generate a respective chopper current from electric power of the supply device, the DC chopper of the auxiliary current terminal in particular being connected to all of the exchange connections of the auxiliary current terminal in order to be able to provide the chopper current to all of the exchange lines.

In this case too, as an alternative, at least one chopper terminal arranged between the supply input and the at least one exchange connection and corresponding to the chopper terminal of the charging terminal may be provided in order to provide a chopper current generated outside the auxiliary current terminal by a DC chopper, in particular chopper current generated in the supply device. As explained with regard to the charging terminal, a respective chopper current may thus also be generated internally here by an internal DC chopper, or generated by an external DC chopper and provided by the chopper terminal. In any case, the auxiliary current terminal may provide at least one additional chopper current that may be used flexibly to increase a charging current of one of the charging terminals. Long overdimensioned lines, particularly between the supply device and the auxiliary current terminal, are also avoided here.

In comparison to the charging terminal, the auxiliary current terminal is therefore used only to provide additional chopper currents to the charging terminals. If for example the power of a charging terminal is not sufficient to be able to cover a current requirement requested by an electric vehicle, the auxiliary current terminal may provide one or more additional chopper currents. The auxiliary current terminal is in this case electrically connected to adjacent charging terminals at the exchange connections via the exchange lines. The auxiliary current terminal accordingly delivers an additional current or chopper currents when this is requested. For this purpose, the auxiliary current terminal is dimensioned according to the charging terminals, such that structurally identical DC choppers or chopper terminals are able to be used in the auxiliary current terminal.

In a further embodiment, the charging station has at least one supply terminal for receiving electric power from the supply device and for forwarding it to the charging terminals. Each supply terminal in this case comprises a main supply input connected to the supply device via a main supply line in order thereby to draw power from the supply device. The supply terminal additionally has at least one supply output in order thereby to forward power drawn from the supply device to the charging terminals and, if applicable, the at least one auxiliary current terminal, in particular in order to forward power to all of the charging terminals. For this purpose, exchange connections corresponding to the exchange connections of the charging terminals and, if applicable, the at least one auxiliary current terminal are present at a first and second connection area of the supply terminal in order to connect the supply terminal at least one connection area to a respective adjacent charging terminal and/or possibly auxiliary current terminal in order to be able to route at least one chopper current through the supply terminal. The two connection areas may in this case be arranged anywhere on the terminal, for example on a right-hand side and a left-hand side of the terminal or else just on the rear side of a terminal.

The at least one supply terminal is accordingly a type of connection and power distribution terminal for connecting the supply device to the charging terminals or the auxiliary current terminals. The charging terminals or the auxiliary current terminal may then be connected to the supply terminal.

In comparison to the charging terminal and auxiliary current terminal, the supply terminal in this case has a separate main supply input in order thereby to draw power from the supply device via a main supply line. This main supply line is in this case preferably designed as a high-power cable, since all of the power that is provided to the electric vehicles is drawn via the main line. Thus, only the supply terminal is connected directly to the supply device. The auxiliary current terminal and the charging terminals, on the other hand, are connected indirectly to the supply device via the supply terminal. The supply terminal thus channels or distributes the power drawn from the supply device to the terminals connected to the supply terminal.

The supply terminal in this case has no DC chopper and no chopper terminal either.

In summary, three different terminals are thus proposed in one preferred embodiment of the charging station, specifically the charging terminal for charging the electric vehicles, the auxiliary current terminal for providing additional chopper currents and the supply terminal for providing electric power from the supply device to the charging terminals and possibly auxiliary current terminals.

The charging terminals and the at least one auxiliary current terminal preferably have structurally identical supply inputs. Two of the supply inputs may thus respectively be connected to one another in order thereby in each case to forward electric supply current or a portion thereof from one supply input to an adjacent supply input. In this case, each charging terminal and, if applicable, each auxiliary current terminal may receive a supply current from an adjacent charging terminal, an auxiliary current terminal or supply terminal. A supply line may in this case also be looped through a supply terminal.

In addition or as an alternative, the supply inputs each have structurally identical connection means, in particular plug connector. The supply inputs thus describe a section of the respective terminal, which may also be referred to as an area, in particular synonymously as an input area. This is advantageous in order to interchangeably connect, in each case selectively, two terminals of the charging terminals or the auxiliary current terminals and the supply terminal to one another. In particular, all of the charging terminals able to be connected to one another, the auxiliary current terminals and the supply terminal form a modular structure. For this purpose, the supply terminal also has exchange connections adapted thereto and, in addition or as an alternative, supply inputs.

One advantage of the structurally identical supply inputs is accordingly the fact that the charging terminals and the auxiliary power terminals are able to be connected in series, similar to a long bus line, such that the charging station is able to be expanded as desired. The charging station may thus be constructed in a completely modular manner from the auxiliary current terminals, the charging terminals and the supply terminal. In addition, it is particularly advantageous for a terminal to be able to be exchanged quickly at matched supply inputs and exchange connections if said terminal has a defect or the charging station is to be expanded if necessary.

Each charging terminal preferably has at least one controllable switching means. The possible controllable switching means in this case have different functions and are differentiated into an exchange switching means, a charging switching means and a bridge switching means.

An exchange switching means is a switching means that is electrically connected to a respective exchange connection in order to control the exchange of at least one chopper current via the exchange switching means with an adjacent charging terminal or an adjacent auxiliary current terminal.

A charging switching means is a switching means that is electrically connected to a respective charging connection in order to switch the output of a charging current to the charging connection.

A bridge switching means is a switching means that is electrically connected to two DC choppers or two chopper terminals in a charging terminal, in particular via two transverse lines, in order to control a superimposition of the chopper currents of the two DC choppers or chopper terminals. As a result, further chopper currents that reach one of the two transverse lines in another way, for example from an adjacent charging terminal, are also able to be connected.

The controllable switching means are in this case arranged essentially or solely on the charging side toward the charging connections in the charging terminal, in particular in order to be able to dynamically distribute the chopper currents and to be able to generate a charging current according to need at any charging connection.

In a further embodiment, it is proposed for each charging terminal to have a first and a second connection area, each with a plurality, in particular the same number, of exchange connections. For this purpose, a longitudinal line is provided for each exchange connection of one of the connection areas in order to electrically connect the respective exchange connection of one connection area to a respective exchange connection of the other connection area. Thus, with m exchange connections of one connection area, m longitudinal lines that in particular run electrically in parallel with one another are provided.

The first or second connection area may in this case be arranged arbitrarily on the terminal, similarly to the connection area of the supply inputs, that is to say for example on a right-hand side and/or left-hand side or just on the rear side of the terminal.

In addition, a charging connection is assigned to each DC chopper or to each chopper terminal and a transverse line is provided for each DC chopper or each chopper terminal in order to connect the DC chopper to the charging connection. With n DC choppers or with n chopper terminals, n transverse lines are thus provided.

There is also provision for each longitudinal line to be connected directly to at least one of the transverse lines via a connection node. A chopper current or a plurality of already superimposed chopper currents of a further charging terminal and/or of an auxiliary current terminal are thereby able to be introduced into the relevant transverse line.

In addition or as an alternative, exactly n−1 bridge switching means are provided in order to electrically connect two respective transverse lines. The chopper currents of the two transverse lines, which may also be superimposed in each case from a plurality of chopper currents, are thereby able to be combined.

In one particular embodiment, it is proposed, in addition or as an alternative, for each transverse line to the charging switching means not to have any further switching means. Each transverse line thus extends from its DC chopper or from its chopper terminal to its charging connection, has a switch toward the charging connection, but no further switch. It has in particular been recognized here that a flexible interconnection of a plurality of DC choppers or chopper terminals or their transverse lines also does not require any additional switching means in the transverse lines.

In addition or as an alternative, it is also proposed for one longitudinal line more than transverse lines to be provided in each charging terminal, such that the following applies: m=n+1. It has been recognized here that many charging terminals and, if appropriate, auxiliary current terminals are thereby able to be interconnected in a highly variable manner but with acceptable effort, in particular such that many chopper currents are able to be exchanged between the charging terminals and, if necessary, be supplemented by chopper currents of the auxiliary current terminals. With as many longitudinal lines as transverse lines, each transverse line of a charging terminal is able to be connected to a different longitudinal line than the other transverse lines. The further longitudinal line then also additionally offers the possibility of routing one or more chopper currents through the respective charging terminal.

According to a further particular embodiment, it is furthermore proposed for a longitudinal line in the charging terminal to be connected directly to two transverse lines, in each case via a connection node, to one of the bridge switching means between the two connection nodes, or to be connected to only one transverse line via a connection node, without having a bridge switching means in the charging terminal. The flexibility described above is thereby able to be achieved without great effort.

In summary, longitudinal and transverse lines are accordingly interconnected with the different controllable switching means within the charging terminal such that this type of interconnection in a kind of matrix form makes it possible to draw or output chopper currents from or to adjacent terminals, and also to be able to internally use all of the DC choppers or chopper terminals of a charging terminal. In this case, however, a complete matrix form is avoided by using switching means only in a very targeted manner and only at certain points. The number of longitudinal lines that also connect the charging terminals, possibly also auxiliary current terminals, overall is also kept very low. In particular in comparison to a complete switching matrix, which would have one longitudinal line for each transverse line of the charging station, that is to say not just for each one charging terminal. In the case of five charging terminals each having two DC choppers, or two chopper terminals, that is to say two transverse lines each, this would be 10 longitudinal lines, whereas, according to one proposed embodiment, only 3 longitudinal lines would be necessary for such an example.

It is in particular made possible, for the previously described form of interconnection of the switching means with the longitudinal and transverse lines, for the number of chopper currents that are provided to be able to be controlled not only by the terminal to which a car is connected, but also for adjacent terminals to be able to be used to charge an electric vehicle.

In a further embodiment, it is proposed for at least one control unit to be provided in the charging station, which control unit is designed to control the charging terminals and/or the auxiliary current terminals such that a charging current of a charging terminal is able to be formed from one chopper current or a plurality of chopper currents. The charging current may in this case be formed either from chopper currents from one or more DC choppers or chopper terminals of the same charging terminal and, in addition or as an alternative, from chopper currents from one or more DC choppers or chopper terminals of one or more other charging terminals, or from DC choppers of one or more other terminals and chopper terminals of one or more other charging terminals. Such a control unit in particular drives the switching means and possibly the DC choppers, which are internal and/or external. Coordination with the supply device also comes into consideration, for example in order to control access to a store or at least take the content of a store into account, or to drive external DC choppers that are arranged there.

In one particular embodiment, it is proposed for at least one control unit to be a decentralized control unit, wherein a respective decentralized control unit is arranged in a charging terminal and/or in an auxiliary current terminal. It is proposed in this case for the control unit to communicate with at least one further control unit in order to control the generation of the charging currents in a coordinated manner. The use of decentralized control units has the advantage that they are also easily able to be coupled to input units at each charging station.

In a further particular embodiment, it is furthermore proposed for at least one control unit to be a superordinate central control unit, wherein the central control unit is configured so as to directly control the charging terminals and/or the auxiliary current terminals. In addition or as an alternative, the central control unit may control the charging terminals and/or the auxiliary current terminals indirectly via the decentralized control units arranged in the charging terminals in order to coordinate the generation of the charging currents. Overall coordination of all of the charging terminals is able to be achieved particularly well by way of a central, superordinate controller. There is preferably provision, in the event of a failure of the superordinate controller, for each charging terminal to be able to provide at least one simple chopper power of a DC chopper or chopper terminal as a fallback option. There is preferably provision for each charging terminal to be designed to independently generate at least one charging current from one, several or all of the chopper currents of the charging terminal in the event of a failure of the superordinate controller.

The charging station is preferably constructed such that it is able to be driven in particular via one or the at least one control unit such that at least one exchange switching means of a charging terminal to which an electric vehicle to be charged is connected is able to be closed in order thereby to draw at least one chopper current from at least one adjacent charging terminal, and in order thereby to generate a charging current for the electric vehicle to be charged.

In one particular embodiment, the charging station is, in addition or as an alternative, constructed such that at least one bridge switching means of the charging terminal to which the electric vehicle is connected is able to be closed in order thereby to combine a plurality of chopper currents from a plurality of DC choppers or chopper terminals arranged in the charging terminal in order to generate the charging current.

In a further particular embodiment, in addition or as an alternative, at least one exchange switching means of at least one adjacent or further charging terminal and/or adjacent or further auxiliary current terminals may furthermore be closed by the control unit in order thereby to draw and combine at least one chopper current from adjacent or further charging terminals or auxiliary current terminals in order to generate the charging current.

It is furthermore proposed for at least one bridge switching means of at least one adjacent or further charging terminal to be able to be closed in order to draw at least one chopper current from a plurality of DC choppers or chopper terminals arranged in the adjacent charging terminal via at least one exchange line in order to generate the charging current.

This provides various possibilities for achieving the variable distribution or assignment of chopper currents. This is achieved in particular by switching the switching means. All of the described switching operations are particularly preferably coordinated in an overall concept. This particularly coordinates the switching of the three switch types, specifically the exchange switching means, the charging switching means and the bridge switching means.

The control unit is also configured in particular so as to control the controllable switching means arranged within a charging terminal via a control signal. For this purpose, the control unit is able to drive the switching means via a conventional control connection, such as directly via a conventional control connection or another communication system.

It is preferably proposed for at least one exchange switching means and at least one bridge switching means to be interconnected such that a chopper current of a DC chopper or chopper terminal of a first charging terminal or of a first auxiliary current terminal is able to flow via a first longitudinal line and the at least one exchange switching means into a second charging terminal. The chopper current in the second charging terminal may additionally flow via a first connection node and a first transverse line to a second longitudinal line. The chopper current may furthermore also flow via a second connection node, the at least one bridge switching means and a third connection node to a second transverse line of the second charging terminal.

These specific interconnection variants thus make it possible to interconnect the exchange switching means and the at least one bridge switching means such that at least one further chopper current is able to be combined in order to generate a charging current, in particular in order to charge an electric vehicle connected to the second transverse line.

The charging station is preferably constructed such that it is able to be driven in particular via one or the at least one control unit such that the controllable switching means are able to be switched in such a way that a charging current consists of at least 3 chopper currents, preferably at least 5 chopper currents, in particular at least 7 chopper currents or is able to be formed therefrom.

One particular advantage of generating a charging current from a plurality of chopper currents is that no or smaller DC choppers have to be used, whether internally or externally, in order to cover a current requirement that may be greater than what a conventional DC chopper is able to generate. By way of example, an electric vehicle that requires a charging current of 400 A could thus be charged by four chopper currents of 100 A each, instead of having to use a large 400 A chopper. The number of chopper currents that are used is additionally able to be reduced quickly once more from four to three, in order to stay with this example, when the need for the high charging current has dropped again. The released DC chopper may then provide a chopper current for another charging procedure.

In a further embodiment, it is proposed for the control unit to be able to control the generation of the charging currents, in particular the number of chopper currents provided at a charging connection, depending on a control criterion. The control criteria may in this case be different, and the following are in particular proposed:
- a type of electric vehicle connected to the charging connection;
- a storage state of the electric vehicle connected to the charging connection;
- a storage state-dependent current requirement of the connected electric vehicle;
- a current request of the connected electric vehicle;
- a charging wish specified by a user for charging the electric vehicle connected to the charging connection; and
- a number of available DC choppers and/or chopper terminals for generating or providing chopper currents to be combined in order to generate a charging current.

A major advantage over conventional charging stations is therefore the fact that unused chopper currents or chopper currents of temporarily unused DC choppers, whether internal or external, are able to be provided to other electric vehicles at adjacent charging terminals, depending on said control criteria. In addition, unused DC choppers are likewise easily able to be switched onward if vehicles are at a charging terminal for a relatively long time and are already fully charged.

What is furthermore proposed is a method for charging a plurality of electric vehicles, in particular electric automobiles, by way of a charging station, and the method comprises the steps of:
supplying the charging station with electric power via a supply device of the charging station; and
charging in each case at least one electric vehicle by way of one of a plurality of charging terminals of the charging station, involving the steps of
drawing electric power from the supply device at a supply input of the charging terminal,
outputting a respective charging current for charging the connected electric vehicle at a charging output with one or more charging connections, wherein the electric vehicle is connected to one of the charging connections at which the charging current is output, and wherein
at least one DC chopper arranged between the supply input and the charging output generates a respective chopper current from electric power of the supply device, or at least one chopper terminal arranged between the supply input and the charging output in each case provides a chopper current generated outside the charging terminal by a respective DC chopper, in particular chopper current generated in the supply device, and in any case
the charging current is formed from a chopper current or a plurality of chopper currents, and wherein
the charging terminals are connected to one another at exchange connections via electrical exchange lines, and optionally
thereby exchange chopper currents with one another.

What is thus proposed is a method that advantageously uses a charging station according to at least one embodiment described above for charging at least one electric vehicle. The method may thus implement and/or utilize the advantage and properties mentioned with regard to the charging station.

It is therefore preferably also proposed for the method to use a charging station according to one abovementioned embodiment.

A further embodiment proposes for:
at least one exchange switching means of a charging terminal to which an electric vehicle to be charged is connected to be closed, and for at least one chopper current to thereby be drawn from at least one adjacent charging terminal, and thus for a charging current to be generated for the electric vehicle to be charged, and/or
at least one bridge switching means of the charging terminal to which the electric vehicle is connected to be closed, and for a plurality of chopper currents from a plurality of DC choppers or chopper terminals arranged in the charging terminal to thereby be combined or superimposed in order to generate the charging current, and/or
at least one exchange switching means of at least one adjacent or further charging terminal and/or adjacent or further auxiliary current terminal to be closed, and for at least one chopper current to thereby be drawn from adjacent or further charging terminals or auxiliary current terminals and combined or superimposed in order to generate the charging current, and/or
at least one bridge switching means of at least one adjacent or further charging terminal to be closed, and for at least one chopper current from a plurality of DC choppers or chopper terminals arranged in the adjacent charging terminal to thereby be drawn via at least one exchange line in order to generate the charging current.

The advantages and properties explained above with regard to the charging station may also be achieved or utilized by way of these method steps. The four features described above are particularly advantageously used together in combination in order thereby to advantageously form charging currents from a plurality of chopper currents.

BRIEF DESCRIPTION OF THE SEVERAL VIEWS OF THE DRAWINGS

The present invention is now explained by way of example in more detail below on the basis of exemplary embodiments with reference to the accompanying figures.

DETAILED DESCRIPTION

Figure 1:
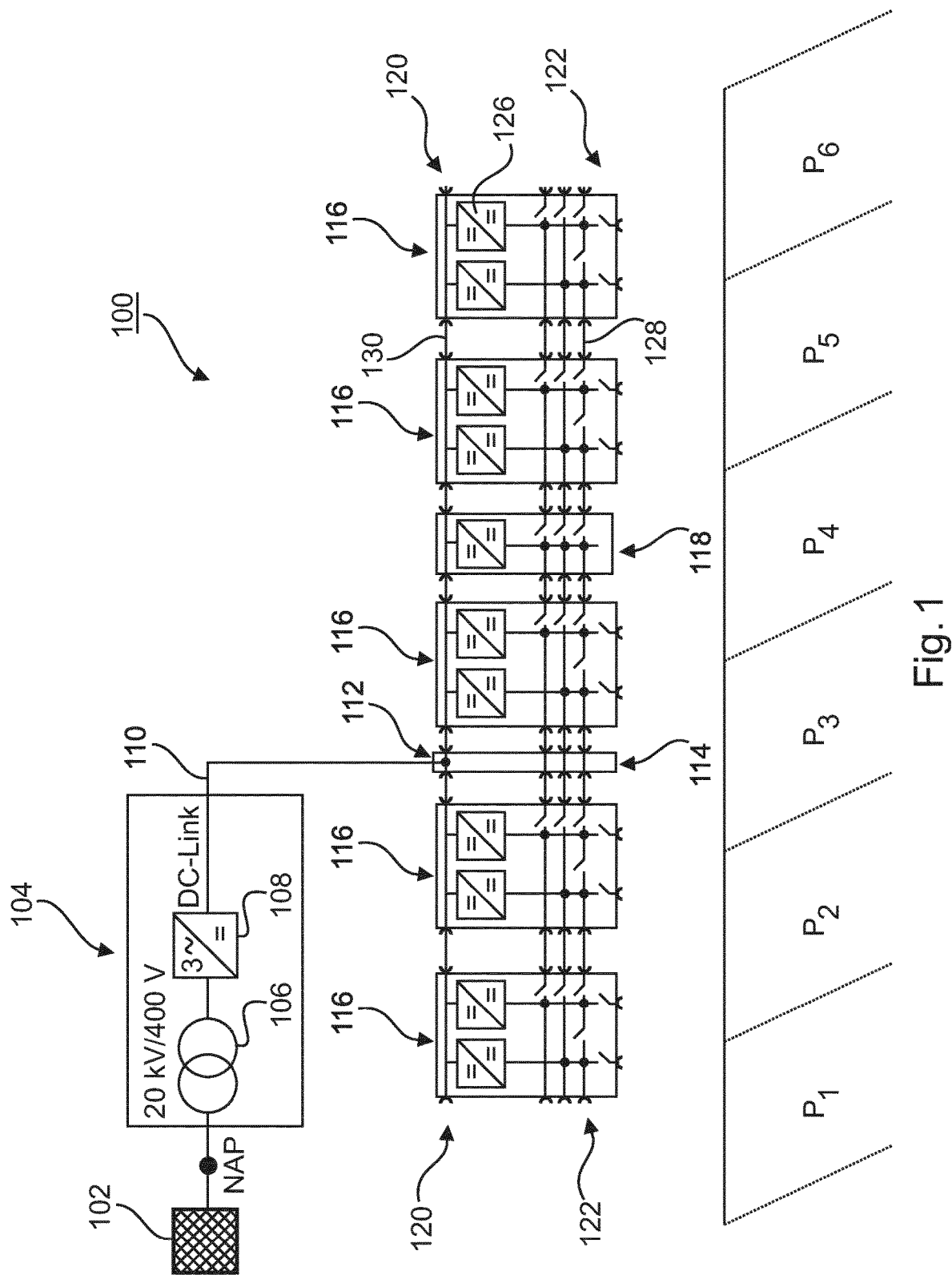
FIG. 1 shows one embodiment of a charging station.

FIG. 1 shows a charging station 100 that is connected to an electricity supply grid 102 via a grid connection point NAP. In order to be able to draw power for charging the electric vehicles from the supply grid 102, a supply device 104 is provided. The supply device 104 in this case comprises at least one transformer 106 and a rectifier unit 108 connected downstream of the transformer. The transformer 106 is in this case connected directly to the supply grid 102 via the grid connection point NAP and in the process transforms a first AC voltage, in particular the grid voltage, into a second AC voltage suitable for the rectifier unit 108. As a specific example, a medium-voltage transformer is illustrated in this respect in FIG. 1, which medium-voltage transformer transforms the grid voltage down from 20 kV to a 400 V AC voltage. The rectifier unit 108 that is shown in this case generates a DC voltage at a DC voltage output from the second AC voltage and is thus able to provide power that is drawn from the supply grid. The supply device 104 is thus provided in particular for connection to an electricity supply grid 102 and for supplying the charging station with electric power.

The charging station 100 shown in FIG. 1 furthermore comprises five charging terminals 116, a supply terminal 114 and an auxiliary current terminal 118, which may also be referred to as terminals for simplification. A detailed description of said terminals follows in the description with regard to FIG. 2.

In one specific example, the terminals (114, 116, 118) of the charging station 100 are arranged next to one another at parking spaces P1 to P6. A plurality of electric vehicles are thus able to be charged, these being parked in the parking spaces P1-P6 for charging. The parking spaces are to be understood to be particularly illustrative and are not intended to limit the number of vehicles to be charged to six, but rather in principle 10 vehicles may also be charged at the charging station that is shown.

A supply terminal 114 is in this case provided in order to forward the power provided by the supply device 104 to the terminals in the form of a DC voltage. For this purpose, the supply terminal 114 is electrically connected to the rectifier unit 108 via a main supply line 110. In order to establish the electrical connection to the main supply line 110, a main supply input 112 is installed on the supply terminal 114. Power is thus able to be drawn from the supply device 104 via the main supply input 112. The power thus drawn is then distributed to the other terminals (116, 118) via a plurality of supply lines 130. The supply terminal 114 is thus for receiving electric power from the supply device and for forwarding it to the charging terminals 116 and, if appropriate, auxiliary current terminals 118.

In addition to the supply terminal, the charging station 100 has a plurality of charging terminals 116 for charging at least one electric vehicle in each case.

Each charging terminal in this case comprises a supply input 120 and a charging output 122. The supply input 120 is in this case configured so as to draw electric power from the supply device 104 by providing connections at the supply input 120 by way of which the terminals are able to be connected to one another at the supply inputs. FIG. 1 in this case shows for example that two charging terminals 116 are arranged on the left and three charging terminals and the auxiliary current terminal 118 are arranged on the right, with reference to the supply terminal 114. All of the terminals are in this case electrically coupled to one another at the respective supply inputs 120 via supply lines 130. In the example shown, there is therefore a respective section of the supply line 130 present between two adjacent terminals, such that there is no single, continuous long supply line, as is customary in the case of a busbar or a bus line. The charging terminals are able to draw the electric power forwarded by the supply terminal 114 directly via the supply lines 130. Depending on the arrangement of the terminals in the charging station, however, the charging terminals 116 and auxiliary current terminals 118 may also draw the forwarded power of the supply terminal 114 indirectly via another terminal. In this case, the supply inputs may then also be considered to be supply outputs for an adjacent terminal.

Figure 2:
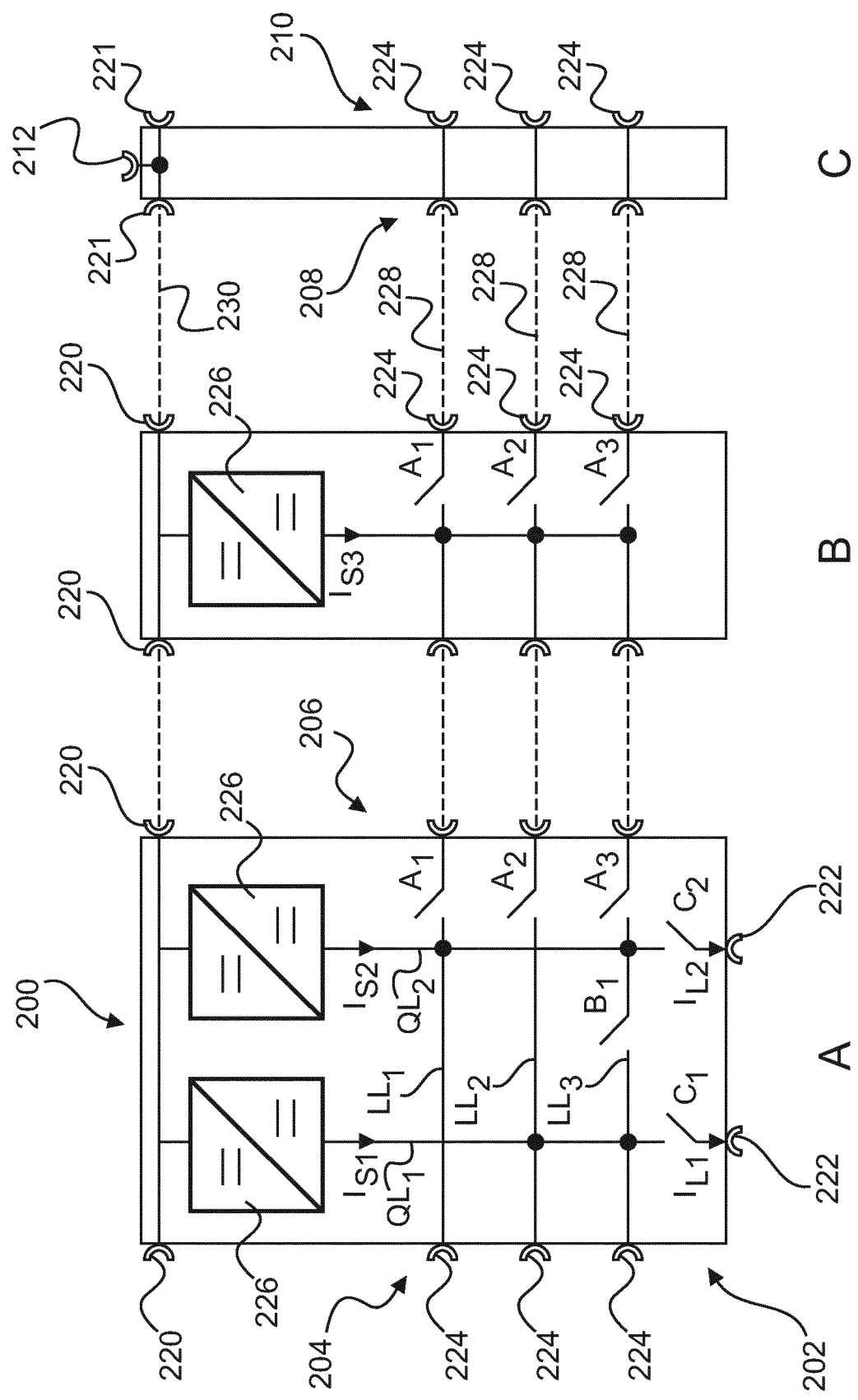
FIG. 2 shows a more detailed embodiment of a charging terminal, an auxiliary current terminal and a supply terminal.

In addition to the supply input 120, a charging output 122 having one or more charging connections is additionally provided at each charging terminal 116, which charging connections are used to output a respective charging current for charging a respective connected electric vehicle. In FIG. 2, for example, two electric vehicles may be connected to the two charging outputs of in each case one of the five charging terminals 116.

At least one DC chopper 126 is in this case arranged in each of the charging terminals 116 between the supply input 120 and the charging output 122 in order to generate in each case one chopper current per chopper or DC-to-DC converter. The currents thus generated are then used to charge an electric vehicle connected to a charging output 122 of one of the charging terminals.

An auxiliary current terminal is provided in the charging station as a further terminal. This auxiliary current terminal serves to generate and provide an additional current for charging the electric vehicles. In this case, it has no charging connections at a charging output for charging an electric vehicle. An additional current is provided for example when a charging terminal is overloaded. This may in this case lead to excessive use at full load, for example, if a current requirement of an electric car exceeds the maximum current that a terminal is able to generate. One specific example is if a vehicle requires a charging current of 400 A and the charging terminal is however only able to provide a maximum of 100 A. The auxiliary current terminal is thus provided in order to generate one or more additional auxiliary currents, in particular chopper currents, in order to provide these to at least one charging terminal, wherein the auxiliary current terminal itself does not have a charging output.

It may be seen in particular from the charging station 100 shown in FIG. 1 that the charging outputs 122 of the charging terminals are connected to one another at exchange connections via electrical exchange lines 128, in order thereby to be able to exchange the generated chopper currents with one another. There is likewise provision for the supply terminal 114 and the auxiliary current terminal 118 also to be electrically coupled on the output side to the charging terminals 116 via the exchange lines 128. For example, an electric vehicle parked in parking space P1 may thus draw a charging current that was at least partially generated by a DC chopper from another charging terminal or an auxiliary current terminal.

FIG. 2 shows a more detailed embodiment of a charging terminal A, an auxiliary current terminal B and a supply terminal C which correspond to the charging terminals 116, the auxiliary current terminal 118 and the supply terminal 114, respectively, of FIG. 1.

Charging terminal A in this case has a supply input 200 and a charging output 202. In this case, two connection means 220 are arranged at the supply input 200, which connection means may be designed for example as plug connectors. Any other charging terminal, an auxiliary current terminal or a supply terminal may thus be connected to these connection means in order to connect the supply inputs of these terminals to one another.

In this case, each charging terminal A has two DC choppers 226 that are arranged in parallel with one another between the supply input 200 and the charging output 202, and each impress a chopper current $I_{S1}$ or $I_{S2}$ into a respective transverse line $QL_1$ and $QL_2$ arranged at the charging output. In this case, each DC chopper 226 is assigned exactly one charging connection 222 and one transverse line $QL_1$ or $QL_2$ for each DC chopper. Thus, with n DC choppers, n transverse lines are used to connect the DC chopper to the charging connection. With two DC choppers present in charging terminal A, the terminal is thus constructed from two transverse lines $QL_1$, $QL_2$ and two charging connections 222.

In addition, a first and a second connection area are indicated for charging terminal A by the arrows 204 and 206, each of which connection areas has a plurality, in particular the same number, of exchange connections 224. The terminals are able to be connected to these exchange connections via substantially parallel exchange lines 228, these being illustrated in dashed form in FIG. 2.

There is also provision for a longitudinal line $LL_1$, $LL_2$, $LL_3$ within the terminal for each exchange connection of one of the connection areas in order to electrically connect the respective exchange connection 224 of one connection area 204, 206 to a respective exchange connection of the other connection area 206, 204, such that, with m exchange connections of one connection area, m longitudinal lines are provided. The longitudinal lines in this case in particular run electrically in parallel with one another. For this purpose, the specific design of charging terminal A has for example three exchange connections in the connection area 206, by way of which three longitudinal lines are provided. The longitudinal lines $LL_1$, $LL_2$ and $LL_3$ in this case connect the two connection areas 204 and 206.

In order for a dynamic exchange of the generated chopper currents to be possible, each longitudinal line $LL_1$, $LL_2$, $LL_3$ is directly connected to at least one of the transverse lines $QL_1$, $QL_2$ via a respective connection node.

In order for the charging currents $I_{L1}$ or $I_{L2}$ additionally to be able to be generated as desired at one of the charging outputs 222, a plurality of controllable switching means or switches that are able to be driven by a control unit are present in the charging terminal. In this case, each charging terminal may have a control unit itself, or a superordinate control unit may take over the driving of the controllable switching means. A mixed form of control units in each charging terminal and a superordinate control unit may likewise be implemented. This is however not illustrated in FIG. 2.

The three exchange switching means or switches A1, A2 and A3 are in this case illustrated in charging terminal A in FIG. 2 as controllable switching means, which exchange switching means are electrically connected to a respective exchange connection 224 in order to control the exchange of at least one chopper current with an adjacent charging terminal or auxiliary current terminal via the exchange means. A further controllable switching means is the bridge switching means or switch B1, which electrically connects two DC choppers in a charging terminal to one another, in the present case via the two transverse lines $QL_1$ and $QL_2$, in order to control superimposition of the chopper currents $I_{S1}$ and $I_{S2}$ of the two DC choppers 226. A respective charging switching means or switches C1 or C2 is likewise arranged on a charging connection 222 in order to control the outputting of the charging current, either $I_{L1}$ or $I_{L2}$.

Charging terminal A illustrated in FIG. 2 may accordingly form a charging current $I_{L1}$ or $I_{L2}$ from a chopper current $I_{S1}$ or $I_{S2}$ or a plurality of chopper currents and even draw or output further chopper currents via the exchange connections.

In comparison to charging terminal A, in auxiliary current terminal B, the DC chopper 226 is in this case connected to all of the exchange connections 224 in order to provide the chopper current $I_{S3}$ on all of the exchange lines 228. The auxiliary current terminal is thus designed to output an additional current. However, in order for chopper currents also to be able to be output in a controlled manner, three exchange switching means A1, A2 and A3 are provided in the auxiliary current terminal, similarly to charging terminal A. These may also be used to forward chopper currents of adjacent terminals if for example the chopper 226 does not generate any current $I_{S3}$ in the auxiliary current terminal.

In comparison to terminals A and B, supply terminal C has an additional main supply input 212 and two respective supply outputs 221, which are structurally identical to the supply inputs of terminals A and B. The supply outputs 221 are in this case used in order thereby to forward the power drawn from the supply device to the charging terminals and, if applicable, the at least one auxiliary current terminal, in particular in order to forward power to all of the charging terminals.

Similarly to terminals A and B, supply terminal C likewise also has exchange connections 224 in order to be connected, at least one connection area 208 or 210, to a respective adjacent charging terminal and/or auxiliary current terminal, if applicable, in order to be able to route at least one chopper current through the supply terminal.

The supply inputs/outputs and exchange connections of terminals A, B and C are in this case substantially structurally identical. A charging station may thus be constructed as desired in a modular manner from terminals A, B and/or C, like a kind of case.

With reference to FIGS. 1 and 2, the invention has been described particularly for charging terminals and auxiliary current terminals, each having one or more DC choppers. This description and said advantages may likewise be transferred analogously to variants that each use one or more chopper terminals instead of one or more DC choppers. By way of example, instead of the two DC choppers 226 and 126, two chopper terminals may be provided in charging terminal A or 116, each of which chopper terminals receives a chopper current from the supply device 104 and provides it in the form of a chopper current $I_{S1}$ or $I_{S2}$. For this purpose, a DC chopper may be provided in the supply device 104 for each chopper terminal, as well as a connection line to the supply device 104 according to FIG. 1. One, several, or all of the charging terminals 116 may be provided with chopper terminals instead of with DC choppers 126. The same applies analogously to the auxiliary current terminal 118 or any other auxiliary current terminals.

Figure 3:
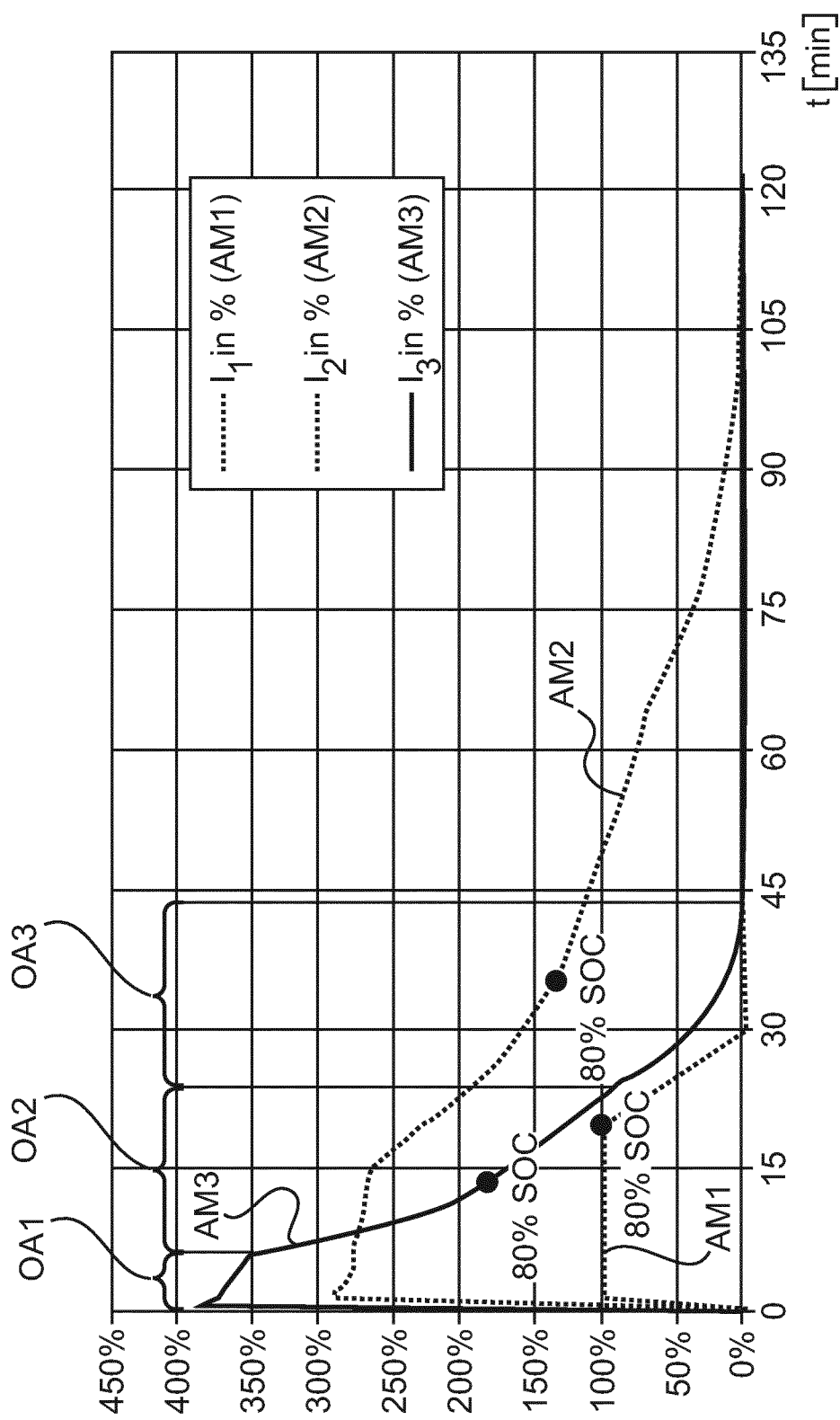
FIG. 3 shows a graph with three different charging current profiles for three respective different vehicle classes.
Figure 4:
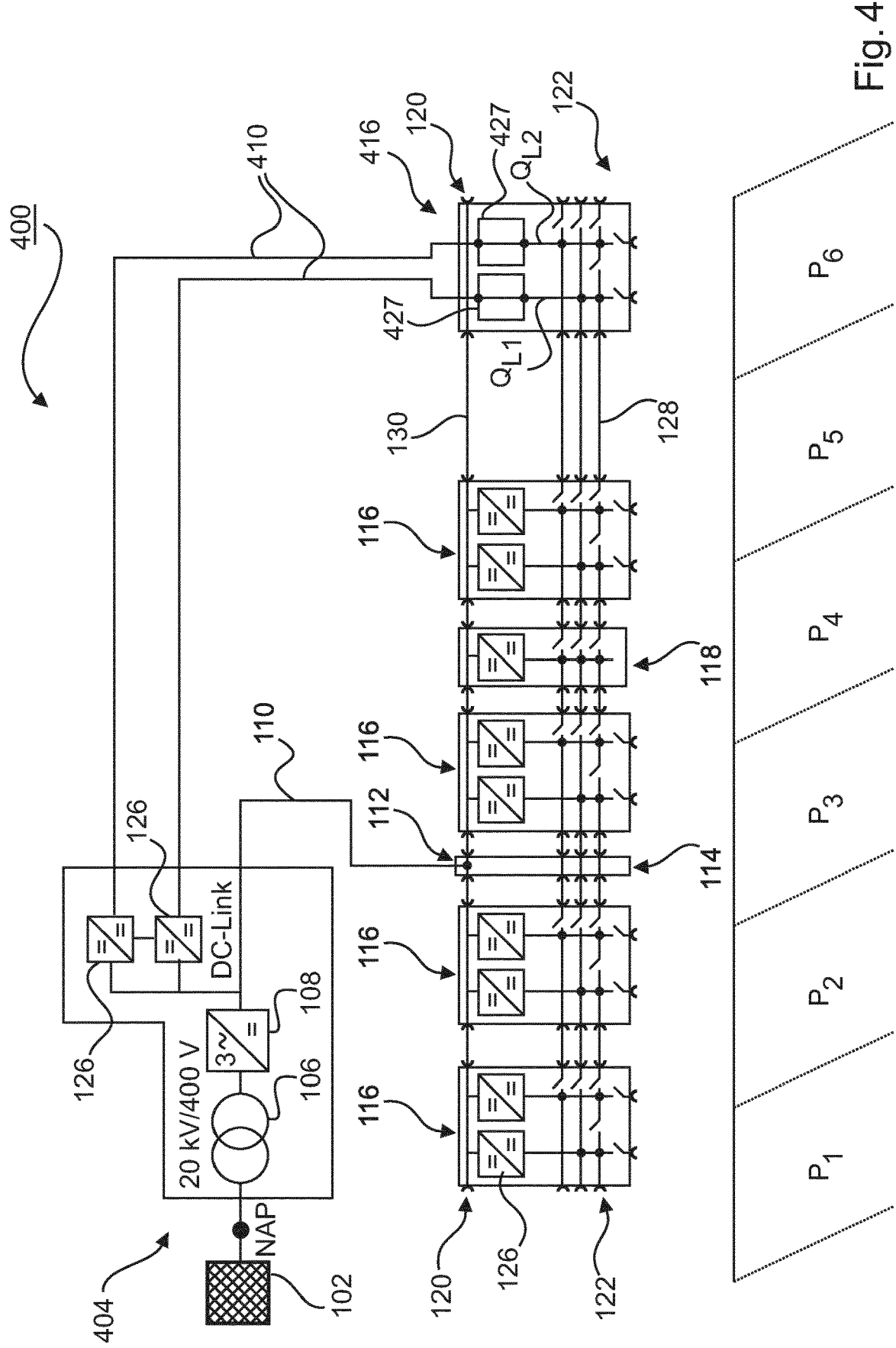
FIG. 4 shows one embodiment of a charging station that is an alternative to FIG. 1.

FIG. 4 illustratively shows one embodiment of a charging station that is an alternative to FIG. 1. For improved clarity, the same reference signs are used for the same or similar elements. The charging station 400 of FIG. 4 differs from the charging station 100 of FIG. 1 in that the charging terminal 416 illustrated on the far right has two chopper terminals 427 instead of two DC choppers 126. The chopper terminals 427 each receive a chopper current via a respective individual line 410, which are each connected to a DC chopper 126 in the supply device 404. The chopper terminals 427 thus essentially provide only one respective chopper current that was generated by respectively one of the two DC choppers 126. The provision is also made here to transverse lines $Q_{L1}$ or $Q_{L2}$ whose further interconnection is described in more detail in FIG. 2. This is also applicable analogously here to the variant of FIG. 4. As an alternative, the two individual lines 410 may also be routed via the supply terminal 114 and then via supply inputs 120. FIG. 3 shows a graph with three different charging current profiles $I_1$, $I_2$ and $I_3$ in percent for three respective different vehicle classes AM1, AM2 and AM3. The loading of the charging station is plotted on the ordinate in percent, wherein the charging terminal in this example is able to output a charging current of 100 A at 100% load, which corresponds to the maximum current of the vehicle class AM1. The time t is plotted on the abscissa in minutes.

In this case, the profile of the three current characteristic curves $I_1$, $I_2$ and $I_3$ is very different, wherein each of the three characteristic curves corresponds to a current characteristic curve of a different vehicle class AM1, AM2 or AM3. It should be noted for the vehicle class AM3 that it requires a charging voltage that is about twice as high as the vehicle classes AM1 and AM2. The 400% charging current, which is initially plotted in FIG. 3 for the vehicle type AM3, thus corresponds to approximately 800% charging power with respect to the vehicle class AM1. Likewise, 80% SOC points of the state of charge, which indicate a state of charge of 80% with respect to a full charge, are reached at very different times. For example, the vehicle class AM1 could correspond to a small car class, the car class AM2 could correspond to a premium class and the class AM3 could correspond to a supercar class. Depending on the car class or vehicle type, the charging characteristic curves or current characteristic curves $I_1$, $I_2$ and $I_3$ adopt a different profile. Two choppers may operate in parallel (double current) or in series (double voltage).

For the car class AM1, for example, a relatively constant charging current of 100 A is required for about 20 minutes, such that a charging terminal with a DC chopper is fully loaded at 100%. Here, a chopper that is able to deliver 100 A thus was already sufficient. In the case of a premium vehicle or a sports car, on the other hand, one charging terminal alone could not provide the charging current required to charge the vehicle types. In order that the DC choppers do not have to be dimensioned for a charging current of for example 400 A for the supercar, the proposed charging terminal is able to draw DC chopper currents via adjacent terminals in order also to be able to charge a supercar in the first charging area AO1. In the charging area AO2, the current requirement of the supercar then drops relatively quickly. DC choppers that are not required may then in turn be activated or switched off or switched over by the control unit depending on the current requirement of the vehicle—if these are no longer required.

With regard to the specific example of the supercar, the charging station could therefore charge the supercar in the first almost 7 minutes at up to 300% load simultaneously with seven or eight DC choppers at about 50 A each. This large number is necessary because the supercar mentioned by way of example requires a charging voltage that is twice as high, such that instead of about 100 A, only about 50 A is able to be supplied per DC chopper. Between 300% and 200%, only six or five DC choppers would then be required, from 200% only four or three DC choppers would still be required, and after 22.5 minutes only two or one DC chopper(s) are required in the operating area AO3 to fully charge the sports car.

The invention claimed is:

1. A charging station for charging a plurality of electric vehicles, the charging station comprising:
   a supply device configured to couple to an electricity supply grid for supplying the charging station with electric power; and
   a plurality of charging terminals, each charging terminal configured to charge at least one electric vehicle, wherein said each charging terminal comprises:
   a supply input configured to receive electric power from the supply device,
   a charging output with one or more charging connections for outputting a respective charging current in order to charge a respective connected electric vehicle, and
   at least one DC chopper arranged between the supply input and the charging output, the at least one DC chopper being configured to at least one of: generate a respective chopper current from the electric power or provide a chopper current generated outside each said charging terminal by a DC chopper,
   wherein each charging current is formed from the chopper current or a plurality of chopper currents, and
   wherein the plurality of charging terminals are connected to one another at exchange connections via electrical exchange lines to exchange chopper currents with one another.

2. The charging station as claimed in claim 1, wherein the charging station has at least one auxiliary current terminal for providing one or more additional chopper currents to at least one charging terminal, wherein the at least one auxiliary current terminal does not have a charging output, and each auxiliary current terminal of the at least one auxiliary current terminal comprises:
   a supply input corresponding to the supply input of a respective charging terminal for drawing electric power from the supply device,
   at least one exchange connection corresponding to an exchange connection of a charging terminal for transmitting chopper currents to at least one charging terminal of the plurality of charging terminals, and
   at least one DC chopper arranged between the supply input and the at least one exchange connection and corresponding to the DC chopper of the said at least one charging terminal to generate a respective chopper current from the electric power of the supply device.

3. The charging station as claimed in claim 2, wherein the charging station has at least one supply terminal for receiving electric power from the supply device and for forwarding the electric power to the plurality of charging terminals, and wherein each supply terminal comprises:
   a main supply input connected to the supply device via a main supply line to draw electric power from the supply device,
   at least one supply output to forward the electric power to the plurality of charging terminals, and
   exchange connections corresponding to the exchange connections of the plurality of charging terminals and, if applicable, the at least one auxiliary current terminal are present at a first connection area and a second connection area of the at least one supply terminal to be connected at at least one connection area, to a respective adjacent charging terminal and/or the at least one auxiliary current terminal to be able to route at least one chopper current through the at least one supply terminal.

4. The charging station as claimed in claim 3, wherein the plurality of charging terminals comprise:
structurally identical supply inputs such that, in each case, two of the structurally identical supply inputs are connected to one another to forward respective electric supply current or a portion thereof from the supply input to an adjacent supply input such that each charging terminal receives supply current from an adjacent charging terminal, the at least one auxiliary current terminal, or the at least one supply terminal, and
wherein the supply inputs and/or the exchange connections each have structurally identical connection means to interchangeably connect, in each case selectively, two charging terminals of the plurality of charging terminals to one another.

5. The charging station as claimed in claim 4, wherein the structurally identical connection means are plug connectors, wherein the two charging terminals are the at least one auxiliary current terminal and the at least one supply terminal such that all of the two charging terminals connected to one another as a whole form a modular structure.

6. The charging station as claimed in claim 2, wherein:
each charging terminal has at least one controllable switch, wherein said at least one controllable switch is from a list comprising:
an exchange switch electrically connected to a respective exchange connection to control an exchange of at least one chopper current via the exchange switch with an adjacent charging terminal or an auxiliary current terminal,
a charging switch electrically connected to a respective charging connection to control an output of a charging current to the charging connection, and
a bridge switch electrically connected to two DC choppers or two chopper terminals in a charging terminal to control a superimposition of the chopper currents of the two DC choppers or the two chopper terminals.

7. The charging station as claimed in claim 6, the charging station comprising:
a first connection area and a second connection area at each charging terminal, each of the first connection area and the second connection area having a plurality of exchange connections,
a set of longitudinal lines, wherein each longitudinal line is configured to provide an exchange connection of one of the connection areas to electrically connect a respective exchange connection of the first connection area to a respective exchange connection of the second connection area such that, with m exchange connections of the first connection area, m longitudinal lines that run electrically in parallel with one another, and
wherein a charging connection is assigned to each DC chopper or chopper terminal, and a transverse line is provided for each DC chopper or each chopper terminal to connect said each DC chopper or the chopper terminal to the charging connection such that with n DC choppers or n chopper terminals, n transverse lines are provided,
wherein each longitudinal line is connected directly to at least one of the n transverse lines via a connection node, and/or
wherein exactly n−1 bridge switches are provided to electrically connect, in each case, two transverse lines, and/or
wherein each transverse line to the charging switch has no further switching means, and/or
wherein one longitudinal line more than transverse lines is provided in each charging terminal such that the following applies: m=n+1,
wherein a longitudinal line in the charging terminal:
is connected directly to two transverse lines via a respective connection node, with a bridge switch between the two connection nodes, or
is connected to just one transverse line via a connection node, without having a bridge switch in the charging terminal.

8. The charging station as claimed in claim 2, comprising at least one chopper terminal arranged between the supply input and the at least one exchange connection and corresponding to the chopper terminal of the charging terminal to provide a chopper current generated outside the at least one auxiliary current terminal by a DC chopper.

9. The charging station as claimed in claim 8, wherein the DC chopper or the chopper terminal of the at least one auxiliary current terminal is connected to all of the exchange connections of the at least one auxiliary current terminal to provide the chopper current to all of the electrical exchange lines.

10. The charging station as claimed in claim 1, further comprising at least one control unit,
wherein the at least one control unit is configured to control either the plurality of charging terminals or auxiliary current terminals, or both such that a charging current of a charging terminal is formed from one chopper current or a plurality of chopper currents,
wherein the charging current is formed from chopper currents from one or more DC choppers or chopper terminals of the same charging terminal, from chopper currents from one or more DC choppers or chopper terminals of one or more other charging terminals, from chopper currents from one or more DC choppers and one or more chopper terminals of a plurality of charging terminals, or from a combination thereof.

11. The charging station as claimed in claim 10, wherein:
the charging station is constructed such that it is able to be driven by the at least one control unit such that:
at least one exchange switch of a charging terminal to which an electric vehicle to be charged is connected is able to be closed to thereby draw at least one chopper current from at least one adjacent charging terminal to thereby generate a charging current for the electric vehicle to be charged, and/or
at least one bridge switch of the charging terminal to which the electric vehicle is connected is able to be closed to thereby combine a plurality of chopper currents from a plurality of DC choppers or chopper terminals arranged in the charging terminal in order to generate the charging current, and/or
at least one exchange switch of at least one adjacent charging terminal or an adjacent auxiliary current terminal is able to be closed to thereby draw and combine at least one chopper current from adjacent charging terminals or adjacent auxiliary current terminals to generate the charging current, and/or
at least one bridge switch of at least one adjacent charging terminal is able to be closed in order to draw at least one chopper current from a plurality of DC choppers or chopper terminals arranged in the adjacent charging terminal via at least one exchange line to generate the charging current.

12. The charging station as claimed in claim 1, wherein:
at least one exchange switching means and at least one bridge switching means are configured to be interconnected such that:
- a chopper current of a DC chopper or a chopper terminal of a first charging terminal or of a first auxiliary current terminal is able to flow via a first longitudinal line and the at least one exchange switching means into a second charging terminal,
- the chopper current in the second charging terminal flows via a first connection node and a first transverse line to a second longitudinal line, and
- the chopper current flows via a second connection node, the at least one bridge switching means and a third connection node to a second transverse line of the second charging terminal,
in order to be combined to generate a charging current.

13. The charging station as claimed in claim 12, wherein the charging current is configured to be used to charge the electric vehicle connected to the second transverse line of the second charging terminal.

14. The charging station as claimed in claim 1, wherein:
the charging station includes at least one control unit such that:
a controllable switching means is able to be switched in such a way that a charging current is able to be formed from at least 3 chopper currents.

15. The charging station as claimed in claim 14, wherein:
the at least one control unit is configured to control the generation of the charging currents provided at a charging connection, depending on a control criterion selected from a list, comprising:
- a type of electric vehicle connected to the charging connection,
- a storage state of the electric vehicle connected to the charging connection,
- a storage state-dependent current requirement of the connected electric vehicle,
- a current request of the connected electric vehicle,
- a charging amount specified by a user for charging the electric vehicle connected to the charging connection, and
- a number of available DC choppers and/or chopper terminals for generating or providing chopper currents to be combined in order to generate a charging current.

16. The charging station as claimed in claim 1, wherein the plurality of electric vehicles is a plurality of electric automobiles.

17. A method for charging a plurality of electric vehicles using a charging station, the method comprising:
supplying the charging station with electric power via a supply device of the charging station; and
charging, in each case, at least one electric vehicle by way of a charging terminal of a plurality of charging terminals of the charging station, wherein the charging comprising:
- receiving electric power from the supply device at a supply input of the charging terminal, and
- outputting a respective charging current for charging the at least one electric vehicle connected at the charging station at a charging output with one or more charging connections, wherein the at least one electric vehicle is connected to one charging connection of the one or more charging connections at which the charging current is output,
- wherein at least one DC chopper arranged between the supply input and the charging output generates a respective chopper current from electric power of the supply device, or at least one chopper terminal arranged between the supply input and the charging output, in each case, provides a chopper current generated outside the charging terminal by a respective DC chopper,
- wherein the respective charging current is formed from a chopper current or a plurality of chopper currents, and
- wherein the plurality of charging terminals are connected to each other from one charging terminal to another charging terminal at exchange connections via electrical exchange lines.

18. The method as claimed in claim 17, further comprising exchanging chopper currents between the plurality of charging terminals.

19. The method as claimed in claim 17, wherein:
at least one exchange switch of a charging terminal to which an electric vehicle to be charged is connected is closed, and at least one chopper current is thereby drawn from at least one adjacent charging terminal, and a charging current is thus generated for the electric vehicle to be charged, and/or
at least one bridge switch of the charging terminal to which the electric vehicle is connected is closed, and a plurality of chopper currents from a plurality of DC choppers or chopper terminals arranged in the charging terminal are thereby combined or superimposed in order to generate the charging current, and/or
at least one exchange switch of at least one adjacent or further charging terminal and/or adjacent or further auxiliary current terminal is closed, and at least one chopper current is thereby drawn from adjacent or further charging terminals or auxiliary current terminals and combined or superimposed in order to generate the charging current, and/or
at least one bridge switch of at least one adjacent or further charging terminal is closed, and at least one chopper current from a plurality of DC choppers or chopper terminals arranged in the adjacent charging terminal is thereby drawn via at least one exchange line in order to generate the charging current.

* * * * *